April 27, 1937.   W. GRÜNDLER   2,078,447
VARIABLE CONDENSER
Filed Feb. 7, 1935
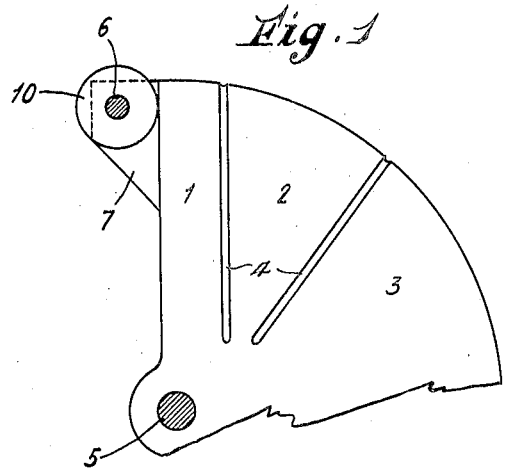
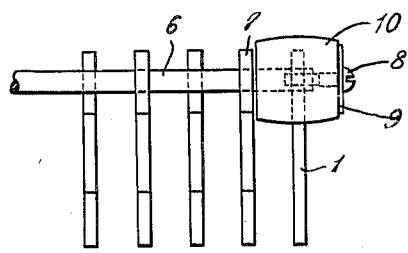
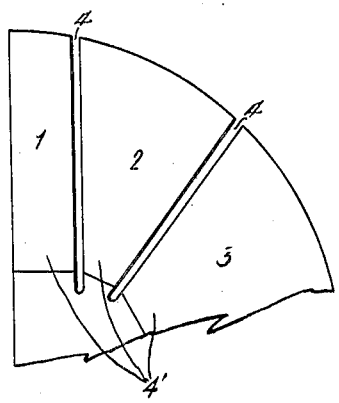
INVENTOR
WOLFGANG GRÜNDLER
BY
ATTORNEY Patented Apr. 27, 1937

2,078,447

UNITED STATES PATENT OFFICE 2,078,447

VARIABLE CONDENSER

Wolfgang Gründler, Berlin, Germany, assignor to Telefunken Gesellschaft für Drahtlose Telegraphie m. b. H., Berlin, Germany, a corporation of Germany Application February 7, 1935, Serial No. 5,332
In Germany February 8, 1934

3 Claims. (Cl. 175—41.5)

In modern radio apparatus in which the loudspeaker and the actual receiver are mounted within a case, disturbing howling noises occur due to the acoustic feedback between the loudspeaker and the single parts of the receiver. Variable condensers are especially sensitive to the acoustic feedback.

It has been found that in variable condensers the end plates especially give rise to this disturbance, since these are slotted in approximately radial direction for permitting capacity adjustment thereof, and consequently they are particularly springy in nature.

In order to avoid this phenomenon, it is proposed in accordance with the invention to especially damp the end plates by suitable means, such as layers of damping material or damping members.

It has been found that, in some instances, it will be sufficient to dampen the outermost part of a slotted end plate. In other cases, a layer of damping material is secured to each of the segments of the slotted plate.

The accompanying drawing shows embodiments of the invention by way of example.

Referring to the drawing,

Fig. 1 is a partial section through a rotor condenser section taken parallel to the rotor plates, Fig. 2 is an end view of the outer portion of the rotor section shown in Fig. 1, and Fig. 3 is a front view showing a portion of a rotor plate embodying a different form of the invention.

Herein are 1, 2, 3, the parts of an end plate separated by means of slots 4, the end plate being fixedly secured on the shaft 5. The pin or rod 6 serves to connect the other rotor plates with each other, the plates being provided with lugs 7 for this purpose. As shown in Fig. 2, the pin 6 is so far extended towards both sides that pieces 10, of rubber or some other damping material, can be placed over these extensions. The damping pieces 10 abut against the outer part 1 of the end plates, whereby the latter will be damped.

The degree of the damping effect can be controlled in accordance with the invention in that the piece 10 can be so compressed by means of a screw 8 and a washer 9 that it expands in the other direction, thus causing a damping of greater or lesser degree. The damping may also be obtained by securing one or more layers of damping material, such as paper, to all or part of the surface of the slotted plate, as shown in Fig. 3, wherein 4' is the damping material.

I claim:—

1. A variable condenser comprising a plurality of parallel plates, a tie rod secured to said plates except the end one of said plates near their outer edges, a member formed of resilient material mounted on said tie rod and means for compressing said member into engagement with the end one of said plates whereby vibrations of said end plate are damped by said member.

2. A variable condenser comprising a plurality of parallel plates, a tie rod secured to said plates except the end one of said plates near their outer edges, a member formed of resilient material and having an aperture therein, said tie rod passing through said aperture and means engaging said tie rod and arranged to press said member into engagement with said end one of said plates.

3. A variable condenser rotor section comprising a plurality of similar parallel plates and a slotted end plate, said plates each having a curved peripheral outer edge and a substantially radial end, lugs secured to said plurality of similar plates and projecting beyond said radial ends, a tie rod secured to said lugs and a member formed of resilient material mounted on said tie rod and in engagement with the edge of said slotted end plate to dampen the vibrations thereof.

WOLFGANG GRÜNDLER.